H. M. SHEDD.
ELECTRIC CIRCUIT AND MOTOR.
APPLICATION FILED DEC. 24, 1912.
1,103,693.
Patented July 14, 1914
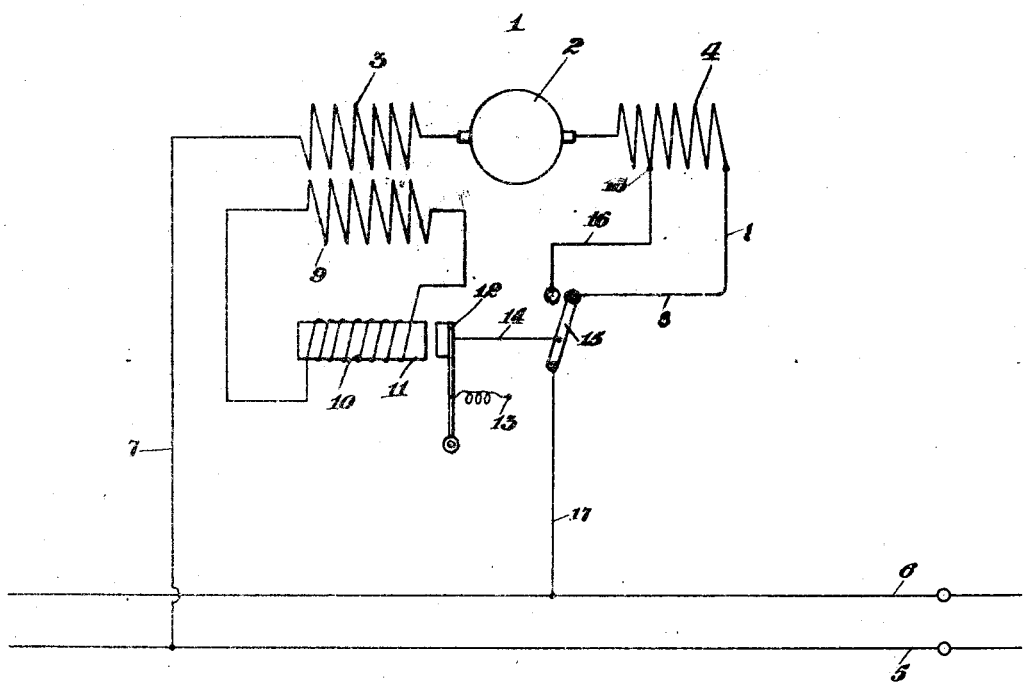

UNITED STATES PATENT OFFICE.

HARRY M. SHEDD, OF ROSELLE, NEW JERSEY, ASSIGNOR TO DAVID A. MARKS, OF NEW YORK, N. Y.

ELECTRIC CIRCUIT AND MOTOR.

1,103,693.   Specification of Letters Patent.   Patented July 14, 1914.

Application filed December 24, 1912. Serial No. 738,460.

*To all whom it may concern:*

Be it known that I, HARRY M. SHEDD, a citizen of the United States, and a resident of Roselle, county of Union, and State of New Jersey, have invented a new and useful Improvement in Electric Circuits and Motors, of which the following is a specification.

The object of my invention is to place a motor in a circuit which may be supplied with a direct or alternating current, and yet run at approximately the same speed under the same conditions of load. This means that it will run at a constant speed even though the current may be changed from one form to the other, as from alternating to direct, and that this change may be made without in any way interfering with the operation of the motor or giving it any attention whatsoever on the part of the attendant. In other words, the object of my invention is to provide a uniform speed motor which automatically adjusts itself to changes in the kind of current which occur during its time of service. This and other objects are accomplished by my invention, one embodiment of which is hereinafter set forth.

For a more particular description, reference is to be had to the accompanying drawing, which diagrammatically illustrates one form of structure for carrying out my invention.

1 indicates a series motor which is for either an alternating or a direct current, and is provided with an armature 2 and field magnets 3 and 4 which are in series with the armature 2. This motor is supplied by electricity from the feed wire or bus bars 5 and 6 which are supplied with an alternating or direct current according to the conditions of service. The wire 5 is connected to the field magnet 3 by a suitable conductor 7, and the field magnet 4 is connected to the wire 6 through a conductor 8.

The above described apparatus is sufficient to run the motor 1 when a direct current is supplied, but the apparatus is not sufficient to run the motor at uniform speed when an alternating current is furnished. To provide for the differences between a direct and an alternating current one of the field magnets, say the field magnet 3, is provided with a secondary winding 9 which is connected with suitable conductors with an electromagnet 10 so that the magnets 10 and 9 are always in series one with the other. The core 11 of the magnet 10 has an armature 12 which is normally kept away from this core, by a suitable spring 13, the armature and spring being mounted in the usual manner. The armature 12 is also connected by a link 14 to a switch 15, which may unite either of two conductors 16 and 8, with a wire 17. The wire 8 runs to the end of the magnet 4 and the wire 16 to a point 18 in the winding 4 so that a part of this field magnet 4 is cut out when the switch 15 is closed. An alternating current in the magnet 8 will induce a corresponding current in the winding 9, and this will cause the magnet 10 to become energized and thereby draw the armature 12 and cause it to close the switch 15 through the link 14 and thereby shunt the current through the conductors 16 and 17 and thereby cut out a part of the winding 4, so that a uniform speed of the armature is maintained although the application of current is varied.

While I have shown one embodiment of my invention, it will be seen that it may be embodied in other ways, all of which come within the scope of the annexed claims.

What I claim is:

1. In a system of the class described, a series electric motor with a primary winding connected to a source of electrical energy, a secondary winding operatively connected with said motor, a magnet connected with said secondary winding and adapted to be energized thereby when a current is induced in said secondary winding, an armature for the magnet, and means connected with the armature for varying the electrical resistance of said motor.

2. In a system of the class described, a motor connected to a source of electrical energy, a secondary winding on the field magnet of said motor, a magnet connected to said secondary winding and adapted to be energized thereby when an alternating current passes through the motor, an armature for the magnet, and means connected with the armature for varying the resistance of the motor.

3. In a system of the class described, a pair of bus-bars, a series motor, conductors connecting said series motor and bus-bars so that said motor may be run when a direct current is applied, a secondary winding on a field magnet of said motor, a magnet connected in series with said secondary winding, an armature for said magnet, a switch connected to said armature, and a circuit adapted to be closed by said switch for shunting out a section of the motor winding.

4. The combination with an electric motor with a field magnet winding of a secondary winding in inductive relation to this field magnet winding of said motor and means operated by current flow in said secondary winding for varying the effective resistance of the field magnet windings of the motor.

5. The combination with an electric motor having a field magnet winding, a secondary winding in inductive relation to this winding of said motor and means operated through said secondary winding when an alternating current flows through said motor to automatically shunt out a portion of the motor winding.

6. Wires adapted to receive either an alternating current or a direct current, an electric motor of the direct current type with an armature and field magnet windings connected in series with said wires, a secondary winding in inductive relation to one of the motor windings and means connected to said secondary winding for automatically varying the resistance of said motor by a current change from an alternating to a direct or a direct to an alternating.

7. The combination with a series electric motor provided with a field magnet forming the primary winding of a transformer, of a secondary winding of this transformer connected to a means for automatically varying the resistance of the motor, when a change is made in the source of supply to the motor from direct to alternating current, or vice versa.

8. The combination with an electric motor having a primary winding of a secondary winding in inductive relation to the primary winding of said motor and means connected to said secondary winding and operated when a change is made in the source of supply from alternating to direct current or vice versa to automatically change the resistance of the said motor.

9. In a system of the class described, a motor with a field magnet having windings adapted to be cut in or out whereby the ampere turns of the field magnet may be varied, and automatic means connected with such field magnet for cutting in or out these windings when the current in the motor changes from direct to alternating, or vice versa.

Signed at New York, in the county of New York, and State of New York, this 23rd day of December, 1912.

HARRY M. SHEDD

Witnesses:
GUSTAVE I. ARONOW,
H. RADZINSKY.